(12) United States Patent
Pratt

(10) Patent No.: X9892
(45) Date of Patent: Jul. 2, 1836

(54) SMUT MACHINE

(76) Inventor: Jones Pratt

Jonas Pratt of Otsego N. York
Letters Patent

The schedule referred to in these Letters Patent and making part of the same, containing a description in the words of the said Jonas Pratt himself, of his improvement in the machine for cleaning smut and dirt from all kinds of Grain –

To all whom it may concern, be it known that I Jonas Pratt of the Town & County of Otsego and State of New York, have invented an improved machine for cleaning smutt and dirt from all kinds of grain, and I do hereby declare the following to be a full and complete description of the same –

The machine that I shall describe may of course vary in size according to the quantity of grain to be cleaned in a given time, but I shall describe one of ordinary size. I make a cast iron cylinder three and one half feet long, twenty two inches diameter at the smallest end on the inside, and thirty one inches diameter at the largest end, on the inside, The cylinder may consist of six or eight segments or staves bolted together, edge to edge, by means of ears on the outside corresponding with each other, and heads of cast iron, upon each end of the cylinder, bolted on the flanges on the outside of each end of the segment. The heads and segments being from one fourth to one half inch in thickness. The inside of the cylinder has from sixty to ninety ribs or projections of equal size, being more at the large end, than at the small end, distributed over the surface, running lengthwise spirally from the small end three feet towards the large end, forming a square cornered ridge of about half an inch in height with the corner pointing towards the centre of the cylinder.

These ribs gain spirally or wind about eight inches in three feet, and flaring six inches diameter in three feet. at the large end a square projection at the termination of the ribs of three inches diameter (or one and a half inches larger all around the upper or large part) and six inches in length, is of a smothe inside surface to discharge the grain through a hole of eight inches by six inches by means of a spout on the under side, when the machine lies horizontally, the spout is perpendicular from near the centre three inches in length on one side, on the other a true taper of eight inches to cover the hole to discharge the grain with an outlet of about one inch by the length of the smothe surface. There is a hole two inches square in the upper part of the [illegible]

some from the top on the right six inches from the small end of the machine to put in the hopper for feeding in grain. There is a hole in the upper part of the head, at the little end, seven inches square circular and corresponding with the cylinder, for the purpose of letting out the smutt dirt &c. with a spout elevated about forty five degrees two and one half feet in length tapering on the upper side to an outlet of four by seven inches. In the largest head is a circle fourteen inches diameter, on the outside of which is four circular holes, eight inches in length & one inch in width, having three arms on each half head these holes are covered with a screen which to prevent the grain from bounding out, and permits the air to come into the cylinder which with the two heads are divided horrizon-tally through their center, which admits the upper half to be taken off to put in the shaft and beaters. The frame consists of four posts six feet long of sufficient size and strength to receive the machine, with three girths on two sides, and two girths on the other two sides with three more girths across the center of the frame tenanted into the other girths for the bearings of the shaft to rest upon, being one girth at the small end and one at the large end, and one outside of the pulley. also two girths running parallel with the machine tenanted into the girths containing the bearings of the shaft, the cylinder is fastened to these two parallel girths by ears and bolts near each end, also two other girths (one at each end) across the center at each end of the fraim tenanted into the other girths and containing pivot boxes for each end of the shaft to run in when standing perpendicular on either end, The shaft is of wrought iron about five and one half feet in length, and about one and a half inches in diameter and lies through the center of the cylinder, with journals or bearings on each end, and resting in boxes on the girths on the outside of the cylinder --

The shaft has a pulley of two or more lifts or sizes of six inches and twelve inches each diameter, for cleaning different kinds of grain placed on the outside of the bear-ing at one end for a strap to drive the shaft. On the shaft inside the cylinder are two heads made fast to and turn with the shaft, into which are inserted the beaters the small head is eighteen inches diameter, the large head is twenty five inches diameter, The beaters are wrought iron, from two to three inches wide and from one fourth to one eighth of an inch thick, and runs nearly the whole lengths of the inside of the cylinder, being inserted edgewise into the aforementioned heads and bolted fast, to arms or projec-tions on said heads. at the large end of the cylinder to fill the six inches smithe surface projected the beaters are projected one and a half inches wide, by five inches in length.

There are usually eight of these beaters, and they are spiral in a contrary direction from the beaters on the cylinder, which prevents the grain from passing through the machine so readily, consequently cleans it better. To operate this machine when it is put together and fastened, the shaft and beaters are set in motion by means of the pulley, which turns the beaters to the right or with the sun supposing the end where the grain is delivered is south. This shaft has from five to eight hundred turns in a minute according to the work done. As the grain passes into the cylinder it is struck by the beaters and driven out against the ribs or projections on the inside of the cylinder, which arrest and makes it rebound against the beaters again and so alternately until by means of the spiral course of the ribs or projections each rebounding sending it a little forward, it gets through the other end of the machine, and is discharged at the spout at the bottom of the cylinder. There is a strong current of air passing in a contrary direction, which carries back all the smutt, filth or dirt, and discharges it through a spout in the upper half of the end of the cylinder. This machine will operate with the cylinder placed horizontally or perpendicular with either end up and the grain will be received and discharged as before mentioned ——

What I claim as my invention or improvement is the ribs or projections which runs spirally through the inside of the cylinder winding in the direction that the grain is driven. ——

Witnesses
Daniel D. Carr
William [illegible]

Jonas Pratt (1296 words)

[illegible]